United States Patent [19]

Farrar et al.

[11] Patent Number: 4,789,695

[45] Date of Patent: Dec. 6, 1988

[54] BLENDS OF ACRYLAMIDE POLYMERS AND MANNICH BASES

[75] Inventors: David Farrar; Peter Flesher, both of West Yorkshire, England

[73] Assignee: Allied Colloids Ltd., Great Britain

[21] Appl. No.: 889,948

[22] Filed: Jul. 24, 1986

[30] Foreign Application Priority Data

Jul. 26, 1985 [GB] United Kingdom ............... 8518900

[51] Int. Cl.⁴ ................ C08K 3/30; C08J 3/00; C08F 220/56

[52] U.S. Cl. .................... 523/336; 524/211; 524/423; 524/555; 524/787; 524/813; 525/132; 525/142; 525/143; 525/153; 525/329.4; 525/374; 528/107

[58] Field of Search ............... 524/423, 787, 555, 211, 524/813; 523/336; 525/132, 142, 143, 329.4, 153, 374

[56] References Cited

U.S. PATENT DOCUMENTS

| | | | |
|---|---|---|---|
| 3,405,106 | 10/1968 | Scanley | 524/787 |
| 4,093,542 | 6/1978 | Dahmen et al. | 524/801 |
| 4,155,847 | 5/1979 | Tanaka et al. | 528/107 |
| 4,335,237 | 6/1982 | Ballweber | 526/910 |
| 4,405,728 | 9/1983 | Krebs et al. | 523/336 |
| 4,409,353 | 10/1983 | Umekawa et al. | 524/423 |
| 4,464,508 | 8/1984 | Easterly | 524/787 |
| 4,470,917 | 9/1984 | Hawe et al. | 526/909 |
| 4,537,695 | 8/1985 | Hawe et al. | 526/328 |
| 4,585,843 | 4/1986 | Flesher et al. | 526/63 |
| 4,668,412 | 5/1987 | Hart et al. | 524/549 |

FOREIGN PATENT DOCUMENTS

| | | | |
|---|---|---|---|
| 1066835 | 11/1979 | Canada . | |
| 0222174 | 12/1983 | Japan | 524/423 |

*Primary Examiner*—Herbert J. Lilling
*Attorney, Agent, or Firm*—Ostrolenk, Faber, Gerb & Soffen

[57] ABSTRACT

A Mannich base of a high molecular weight acrylamide polymer can be made by reacting, in aqueous solution, the polymer with a Mannich base of a low molecular weight compound such as urea. A composition of the polymer and the Mannich base is preferably substantially non-aqueous.

16 Claims, No Drawings

BLENDS OF ACRYLAMIDE POLYMERS AND MANNICH BASES

It is well known that Mannich bases of high molecular weight polyacrylamide are useful in, for instance, flocculation processes. They can be made by polymerising the Mannich base of acrylamide or, more usually, by converting polyacrylamide into its Mannich base, for instance by reacting it with dimethylamine or other di-$C_{1-4}$-alkylamine and formaldehyde.

At the point of use, the polymer needs to be in solution in water and a well known problem of polyacrylamide Mannich bases is their tendency to cross link, especially at high solids contents. In practice, therefore, they are generally supplied as dilute aqueous solutions and this involves the transport of large volumes of water. Even these solutions are liable to cross link on storage. Attempts at providing high molecular weight polyacrylamide Mannich bases in higher concentrations have been made, see for instance GB No. 1,462,905, but commercially have not proved very satisfactory. Again, undesirable cross linking has tended to occur during the concentration processes and/or during storage. The polyacrylamide Mannich bases are made either by polymerising the Mannich base of acrylamide or by converting polyacrylamide into its Mannich base, for instance by reacting it with dimethylamine and formaldehyde.

It is known to try to avoid the problem of large volumes of water and/or cross linking by forming the Mannich base at the point of use by adding dimethylamine and formaldehyde to a solution of polyacrylamide. If the dimethylamine and formaldehyde are blended before addition the blend tends to be unstable. Accordingly it is generally necessary to supply them separately into the polyacrylamide solution. This requires supplying three separate materials (polyacrylamide, formaldehyde and dimethylamine) and it is commercially and environmentally undesirable to add these products to an aqueous polyacrylamide solution either individually or in combination. In particular, there may be serious odour problems. Accordingly the process has not proved satisfactory.

We have surprisingly found that an aqueous solution of a Mannich base of a high molecular weight acrylamide polymer can be made by reacting, in aqueous solution, the polymer with a Mannich base of a low molecular weight compound.

Compositions according to the invention comprise water soluble, high molecular weight, acrylamide polymer and water soluble Mannich base of a low molecular weight, Mannich base-forming, compound. The composition can be aqueous in which event it may only have a short existence while the reaction occurs between the Mannich base of the low molecular weight compound and the acrylamide polymer.

It is possible that true reaction is not occurring and that it would be difficult or impossible to extract from the resultant solution an isolatable Mannich base of the polymer. Accordingly, it is possible that the solution merely performs as if it contained such a Mannich base. However the present evidence indicates that the reaction does involve an equilibrium between the Mannich base of the low molecular weight compound and the Mannich base of the polymer and that this equilibrium, with all the materials tested so far, results in high, and often substantially complete, formation in the solution of the Mannich base of the polymer.

By the invention the desired Mannich base can be obtained at the same time of use or just prior to it either as a dilutable concentrate or ready for use, and so the invention avoids the problems associated with the need to transport large volumes of water to the user and/or the problems of cross linking and instability during concentration and/or storage. The invention also avoids the problems associated with reacting the polymer with formaldehyde and dimethylamine, individually or as a blend, at the point of use.

The method may be conducted, and the initial aqueous compositions may be made, by supplying the polymer and the Mannich base of the low molecular weight compound separately and blending them in aqueous solution. For instance one may be added, in concentrate or solid form, to an aqueous solution of the other, or an aqueous solution of one may be blended with an aqueous solution of the other. For instance an aqueous solution for use as a flocculant may be prepared by dissolving one of the components into water and then by adding the other component into the resultant solution, both additions generally being conducted in line on the way to the point of use of the solution as a flocculant.

Preferably however, the reaction is conducted by blending the polymer and the Mannich base of low molecular weight compound simultaneously with water and this is best achieved by diluting with water a substantially non-aqueous composition comprising the acrylamide polymer and the Mannich base of the low molecular weight compound. These substantially non-aqueous compositions form a preferred part of the invention.

The presence of significant amounts of water in the substantially non-aqueous composition will tend to result in some reaction within the composition and the consequential formation of the Mannich base of the acrylamide polymer. This may be commercially acceptable for instance if the user prepares the composition substantially at the point of use from concentrated or anhydrous components (polymer and Mannich base) and uses the aqueous composition relatively soon after its formation. Also the provision of these compositions, even if there is some cross linking during storage, may still give results at least as good, and generally better, than the compositions of GB No. 1,462,905 since they can be made to high solids concentrations without having to dehydrate with consequential risk of cross linking, the Mannich base of the high molecular weight polymer. Generally the amount of free water in the composition is always below 50% by weight of the composition and generally below 50% by weight of the polymer. The free water is the water that is available for reaction with either or both components.

Preferably however, the amount of free water in the composition is below 20% and most preferably below 15% by weight of each component and preferably also by weight of the total composition. If significant amounts of free water are present in the composition, this may result in some reaction between the Mannich base and the polymer unless the composition is formulated with the Mannich base and the polymer in separate phases such that there is substantially no transfer between the phases.

In the substantially non-aqueous compositions of the invention, the acrylamide polymer is preferably in particulate form and is in the form of a heterogeneous blend with the Mannich base of the low molecular weight compound. By having the composition as a heterogeneous composition, rather than a homogeneous composition in, for instance, a common solvent, the risk of unwanted reaction between the components during storage is minimised. For instance the composition may be a dispersion of one component, in particulate form, in a continuous phase of the other component or of a non-aqueous solution of the other component. A particulate composition may be a blend of particles of one component with particles of the other component.

Preferred compositions of the invention are made by blending the polymer, generally in substantially anhydrous form, with the Mannich base of a low molecular weight compound, generally in a liquid (preferably substantially anhydrous) form. This liquid form may consist of the Mannich base undiluted, if it is an oil at ambient or other mixing temperature, or may be a solution of the Mannich base in an appropriate solvent, for instance an alcohol, generally substantially anhydrous.

One method of making the composition is by blending polymer particles with the Mannich base. For instance substantially anhydrous polyacrylamide powder having a particle size generally below 1 mm, typically 10 to 500 microns and most preferably 50 to 300 microns, may be mixed with the liquid Mannich base.

Another method of making the preferred composition is by forming the polymer as a dispersion in a non-aqueous liquid, generally by reverse phase polymerisation and incorporating the Mannich base liquid as part or all of the continuous phase of the dispersion. For instance after making the polymer by reverse phase polymerisation, Mannich base oil or solution may be blended into the non-aqueous continuous phase. When the polymer is made by reverse phase polymerisation its particle size is generally small, for instance below 10 microns and often below 3 microns. Typically it is 0.1 to 2 microns.

The formation of the Mannich base of the low molecular weight compound is a reaction that is generally accompanied by the formation of water. If the proportions of Mannich base and polymer are such that the presence of this by-product water would be undesirable, then the Mannich base may be dehydrated before or during combination with the amide polymer.

For best storage stability the composition should be substantially anhydrous, i.e., contain substantially no free water, typically below 10% and preferably below 5% by weight of the composition. Free water that initially contaminated the Mannich base is preferably absorbed by a material that can be hydrated by this water. Thus the composition is made by blending substantially dry polymer with the Mannich base contaminated with water in the presence of a material that can be hydrated by the contaminated water. For instance the Mannich base and the polymer may be blended in the presence of an anhdrous or low hydrate form of a material that can be hydrated to a higher hydrate form by the contaminating water. For instance the anhydrous or low hydrate may be blended with the Mannich base and during or after this blending the dry polymer may be combined with the blend.

EP No. 0123486 describes processes in which the temperature of a bulk gel polymerisation mixture can be advantageously controlled by including in the mixture an inorganic hydrate that reversibly undergoes dehydration. Reference should be made to EP No. 0123486 for full disclosure of that process. It is particularly preferred in the invention that the polymer is made by this process, namely by gel polymerisation of acrylamide in intimate mixture with an organic hydrate that reversibly undergoes dehydration during polymerisation with absorption of heat of polymerisation, comminuting and drying the resultant gel while the hydrate remains in its anhydrous or low hydrate form, and blending the comminuted product with the Mannich base that is contaminated with water and thereby absorbing the contaminated water by the hydrate. The polymerisation in the presence of the inorganic hydrate permits the formation of a polymer having a uniform and high molecular weight, because of the better temperature control during the polymerisation, and the utilisation of the resultant anhydrous or low hydrate form of the hydrate is a particularly effective and economic way of ensuring that the final composition that contains Mannich base is substantially free of water and so has good storage stability. The preferred inorganic hydrate is sodium sulphate which may be introduced into the polymerisation mixture as decahydrate but which will be converted primarily to the anhydrous form during polymerisation, and anhydrous sodium sulphate can then be used to absorb the contaminating water with re-formation of sodium sulphate decahydrate. However any of the inorganic hydrates mentioned in EP No. 0123486 may be utilised.

The water soluble acrylamide polymer may be a polymer of methacrylamide but preferably is a polymer of acrylamide. Other monomers may be copolymerised with it but preferably polyacrylamide homopolymer is used (although this may contain very small amounts of anionic, acrylic acid, groups). It is high molecular weight, e.g., above 1 million and often 5 to 30 million, and normally has intrinsic viscosity (in dl/g) above 5 and generally above 8.

One advantage of the invention is that the amide polymer can be of very high molecular weight, for instance having intrinsic viscosity above 10 and typically 12 to 16 or higher, since it is controlled primarily by the availability of the polymer and its solubility in water. In prior art methods of providing a Mannich base of a polymer it has been necessary to restrict the molecular weight of the polymer, for instance to below IV 8, because of the increased handling problems associated with Mannich base polymers of higher molecular weight.

Another advantage of the invention is that the Mannich base of low molecular weight compound and polymer can be combined, by simple mixing, in any desired proportions. In the prior art it has been necessary, at the time of chemical synthesis, to decide upon the desired proportions. In the invention the desired proportions can be selected at will at the time of blending, either to form a stable composition or the aqueous solution.

The low molecular weight compound that is used in the invention may be any compound that will form a Mannich base which can undergo effective equilibrium with the polyacrylamide or other polymer and that provides a Mannich base having substantially less risk of cross linking and storage problems than occurs with polymeric Mannich bases. The low molecular weight compound generally has a molecular weight below 1,000 and preferably below 300. It is generally a monomeric compound. Generally it is non-polymerisable although it may be possible to use acrylamide. The low molecular weight compound may be monofunctional or polyfunctional. For instance it may be capable of being substituted by two or three Mannich based groups although if it is polyfunctional it may, in the invention, be substituted only partially.

The low molecular weight compound may be selected from any chemical types capable of forming Mannich bases such as phenols, ketones and other carbonyl compounds, especially amides. Preferred amides are acetamide, urea and formamide, with urea being particularly preferred. The presence of excess urea in the compositions and processes of the invention is not undesirable, and indeed may be beneficial, since urea is often added to polymeric compositions in order to promote their stability.

Mannich base is formed in conventional manner by reaction between the low molecular molecular weight compound and formaldehyde or a formaldehyde donor (for instance paraformaldehyde or trioxane) and an appropriate nitrogenous material which is preferably a secondary amine, generally an aliphatic secondary amine. The size of the aliphatic groups should be such that the reaction can be performed satisfactorily and the resultant compound is soluble in water and so generally the amine contains less than 8 carbon atoms. Preferred amines are dialkylamines, each alkyl group preferably containing 1, 2 or 3 carbon atoms.

Compositions of the polymer and the low molecular weight Mannich base can generally be dissolved into water simply by stirring the composition into water, optionally in the presence of an appropriate, generally high HLB, surfactant. This surfactant is generally not needed if the composition was made merely by blending dry polyacrylamide into a Mannich base oil.

The aqueous solutions obtained in the invention may be used wherever polymeric Mannich bases have previously been used, for instance in flocculation, sedimentation and retention processes.

The invention includes not only the described processes of making and using the solutions and the described compositions, but also includes novel Mannich bases of low molecular weight compounds.

The following are examples of the invention.

EXAMPLE 1

Various Mannich bases of urea were made by reacting amine, formaldehyde and urea. In each process paraformaldehyde was added to a resin pot fitted with a stirrer, thermometer and a condenser having cold methanol cooling. The amine was added slowly via a separating funnel at such a rate as to ensure that the temperature remained less than 40° C., generally below 30° C. The reaction was conducted for a further 2 to 3 hours and the urea was then added. The reaction mixture was stirred until a clear solution was obtained.

The mono-substituted urea Mannich using dimethylamine (A) was formed using 75 g of 60% dimethylamine, 30 g paraformaldehyde and 60 g urea (equimolar proportions) to give a product of molecular weight 117 having theoretical activity 70.9%. The di-substituted urea Mannich product was obtained in the same way as A except that the amount of urea was 30 g (0.5 mole), the resultant product (B) having molecular weight 174 and theoretical activity 64.4%. The mono-substituted diethylamine compound (C) corresponding to A was obtained in the same way as A but using 73.4 g of 99.5% diethylamine, the product having theoretical activity of 88.7%. The di-substituted urea diethylamine compound (D) was obtained in the same way as B but using 73.4 g of 99.5% diethylamine, to give a product D having theoretical activity of 86.3%.

EXAMPLE 2

A 2% solution of high molecular weight polyacrylamide was prepared and one of the Mannich derivatives A to D was added in the ratio 1 mole acrylamide to 1 mole derivative. Clear viscous solutions were obtained and after dilution in conventional manner, there were evaluated for sewage sludge flocculation using CST (capiliary suction technique). These solutions were labelled, respectively, A to D. As a comparison a solution was also prepared from a conventional polymeric Mannich obtained by reacting polyacrylamide with dimethylamine and formaldehyde in the molar ratio 1:1:1 immediately prior to use. Accordingly this solution was a freshly prepared Mannich. The solution was labelled E. The CST results are shown in the following table from which it is apparent that the performance of the solutions made in accordance with the invention is not disadvantageous compared to the performance of conventional freshly prepared polymeric Mannich solutions. However the invention has the advantage that it is not essential to produce the reactive material chemically at the point of use or supply it to the point of use as a dilute solution.

| Solution | 30/10 | 30/25 | 30/40 | 50/10 | 50/25 | 50/40 |
|---|---|---|---|---|---|---|
| A | 52 | 135 | 179 | 20 | 45 | 71 |
| B | 53 | 136 | 190 | 19 | 40 | 94 |
| D | 45 | 120 | 162 | 17 | 35 | 61 |
| E | 42 | 97 | 130 | 18 | 39 | 61 |

EXAMPLE 3

Finely ground polyacrylamide was dispersed in the di-Mannichs B or D. A stable dispersion was obtained and on addition to water, a clear viscous solution formed quickly. This solution was effective as a sewage slude flocculant. If the dispersion of polyacrylamide in Mannich is inadequately stable then an appropriate stabiliser may be added.

EXAMPLE 4

A substantially anhydrous dispersion of polyacrylamide particles below 3 microns in size dispersed in a mineral oil and stabilised by an amphipathic stabiliser was made by reverse phase polymerisation followed by azeotropic distillation, all in conventional manner. The product contained 50% by weight polymer. Di-Mannichs B or D were added to the dispersion in the ratio 1 mole of acrylamide to 0.5 mole Mannich. The products were stable dispersions. The products could then be dispersed easily into water in the presence of a high HLB surfactant to form a high viscosity solution which could then be readily diluted to form an effective flocculating solution.

EXAMPLE 5

150 g of a 52.5% acrylamide solution and 150 g of sodium sulphate decahydrate are stirred and a redox polymerisation initiator system is incorporated, in conventional manner. The polymerisation temperature rises to around 35° C. and is then held relatively constant at that temperature until it rises further to about 55° C. The polymerisation is then terminated. The product is dried and comminuted in conventional manner and is recorded as having IV 14.3.

In a comparative example, in which the 150 g of sodium sulphate decahydrate is replaced by 150 g water, the temperature rises steadily and reached about 80° C., and the product has IV about 11.1.

The comminuted blend of sodium sulphate (anhydrous) and polyacrylamide is then dispersed into a Mannich base as in example 3 to form a very storage stable composition.

We claim:

1. A composition that is substantially non-aqueous and is a heterogeneous blend of (a) particulate, water soluble, high molecular weight acrylamide polymer and (b) water soluble Mannich base of a low molecular weight, Mannich base-forming compound selected from phenols, ketones and amides and having molecular weight below 1,000.

2. A composition according to claim 1 that is substantially non-aqueous and in which the acrylamide polymer is dispersed in a continuous phase containing the Mannich base.

3. A composition according to claim 2 containing less than 20% by weight free water based on the total composition.

4. A composition that is substantially anhydrous and made by blending water soluble Mannich base of a low molecular weight, Mannich base-forming compound selected from phenols, ketones and amides and having molecular weight below 1,000 contaminated with water, with a material that can be hydrated by the contaminating water and with substantially dry, water soluble, high molecular weight acrylamide polymer.

5. A composition according to claim 4 in which the material that can be hydrated is an anhydrous or low hydrate form of an inorganic hydrate that reversibly releases water on heating to form the said material, and the anhydrous or low hydrate form is introduced into the composition as an intimate mixture with the acrylamide polymer, having been made by gel polymerisation of acrylamide in the presence of the anhydrous or low hydrate form.

6. A composition according to claim 4 in which the material that can be hydrated is sodium sulphate in anhydrous or low hydrate form.

7. A composition according to claim 1 in which the acrylamide polymer is polyacrylamide and has IV above 10.

8. A composition according to claim 1 that comprises a blend of a water soluble, high molecular weight, acrylamide polymer and water soluble Mannich base of urea.

9. A method of making an anhydrous composition that comprises water soluble, high molecular weight, acrylamide polymer and water soluble Mannich base of a Mannich base-forming compound selected from phenols, ketones and amides and having molecular weight below 1,000 comprising gel polymerising acrylamide in intimate admixture with an inorganic hydrate that reversibly undergoes dehydration during polymerisation with absorption of heat of polymerisation, comminuting and drying the resultant gel while the hydrate remains in anhydrous or low hydrate form and blending the comminuted product with the said low molecular weight Mannich base while that is contaminated with water and absorbing the contaminated water by the anhydrous or low hydrate form of the inorganic hydrate.

10. A method accordng to claim 9 in which the said Mannich base-forming compound is urea.

11. A method of making an aqueous solution of a Mannich base of a water soluble high molcular weight acrylamide polymer comprising dissolving into water the acrylamide polymer and a water soluble low molecular weight Mannich base of urea and allowing the said low molecular weight Mannich base to react with the acrylamide polymer.

12. A method according to claim 11 in which the acrylamide is polyacrylamide and has IV above 10.

13. A composition according to claim 3 in which the said Mannich base-forming compound is urea.

14. A composition according to claim 13 containing a material that can be hydrated by water and which is an anhydrous or low hydrate form of an inorganic hydrate that reversibly releases water on heating to form the said material.

15. A composition according to claim 14 in which the said material that can be hydrated is sodium sulfate in anhydrous or low hydrate form.

16. A composition according to claim 15 in which the acrylamide polymer is polyacrylamide and has IV above 10.

* * * * *